United States Patent [19]

Rubenstein et al.

[11] 4,269,317
[45] May 26, 1981

[54] DISPENSER SUPPORT

[76] Inventors: Maurice D. Rubenstein; Daniel Rubenstein, both of 15 York St., Richmond, Victoria, 3121, Australia

[21] Appl. No.: 55,753

[22] Filed: Jul. 6, 1979

[30] Foreign Application Priority Data

Aug. 16, 1978 [AU] Australia .............................. PD5518

[51] Int. Cl.³ .............................................. A47F 5/08
[52] U.S. Cl. ....................................... 211/72; 211/88; 248/311.2
[58] Field of Search ................ 211/71, 72, 88; 225/42; 248/311.1 R, 225.1, 201

[56] References Cited

U.S. PATENT DOCUMENTS

| 1,747,642 | 2/1930 | Neitzke | 211/88 |
| 1,947,165 | 2/1934 | Nelke | 211/88 |
| 3,593,470 | 7/1971 | Francis | 211/88 X |
| 4,094,416 | 6/1978 | Smith | 211/88 X |

Primary Examiner—Roy D. Frazier
Assistant Examiner—Robert W. Gibson, Jr.
Attorney, Agent, or Firm—Haseltine and Lake

[57] ABSTRACT

The invention relates to a support for holding dispensers such as rolls of metal foil, cellulose sheet material used in the kitchen. Previously, no convenient manner of supporting such articles has been proposed. The support includes a frame (10) have two side edges (22) which are provided with a series of horizontally aligned slots (24). The slots (24) receive a bracket (16) in such a manner that the bracket (16) is held by the frame (10) so that dispenser (26) such as cuboidal boxes of the above-mentioned rolls may be conveniently held by the support.

3 Claims, 3 Drawing Figures

DISPENSER SUPPORT

This invention relates to a support for dispensers of sheet material stored in roll form, such as aluminium foil, plastic wrapping and rolls of garbage bags.

Most households use such materials for cooking, wrapping and other uses. Normally, the materials are sold and used in cuboidal containers from which the sheet material is withdrawn. Normally, such containers are housed in drawers or other areas which are inaccessible. When a particular material is required, the container must be retrieved, and both hands used to dispense a length of the sheet material. Previously, no device has been proposed which will provide for convenient storage of the abovementioned dispensers.

The invention overcomes this problem by providing a support including a frame which has means to removably retain support means for holding the dispensers.

It is an object of this invention to provide a support for such containers to enable the contents to be readily dispensed.

The invention provides a support including a frame, means on said frame to removably retain support means adapted to support a dispenser.

The invention also provides a support including a frame said frame having support means therein for retaining a substantially cuboidal dispenser.

Preferably, the means are opposed slots, and the support means are brackets.

Accordingly, the sheet material may be stored on the frame where it is readily assesable.

An embodiment of the invention, which may be preferred will now be described, with reference to the accompanying drawings, in which.

Figure 1:
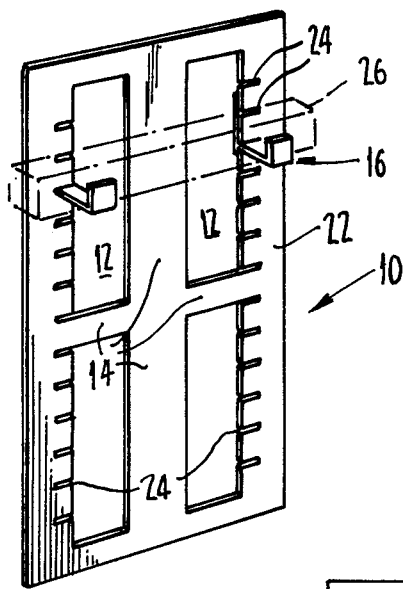
FIG. 1 is a perspective view of one form of support according to the invention.
Figure 3:
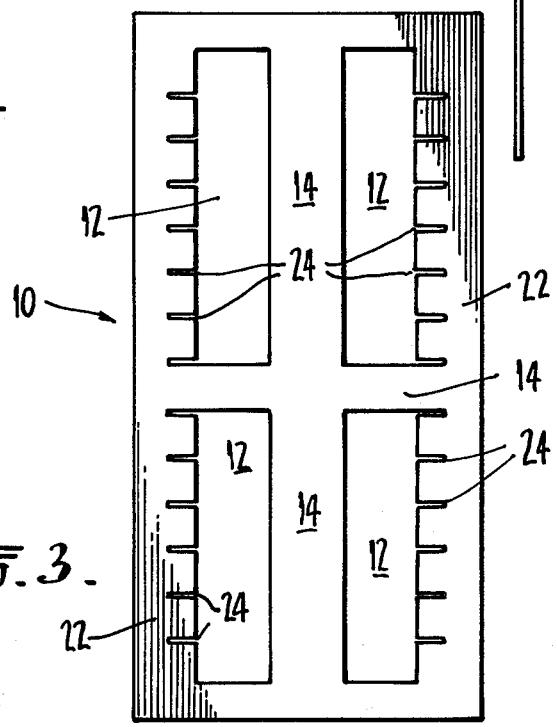
FIG. 3 is a plan view of the frame of the support of FIG. 1.

Referring firstly to FIGS. 1 and 3, the support includes a rectangular frame 10, in which there are four rectangular apertures 12, separated by cross-members 14. The frame is preferably formed from polypropylene or from other plastics material.

The inner edges of each vertical edge member 22, of the frame are provided with a plurality of horizontal slots 24, which are arranged in opposing co-linear relation.

Figure 2:
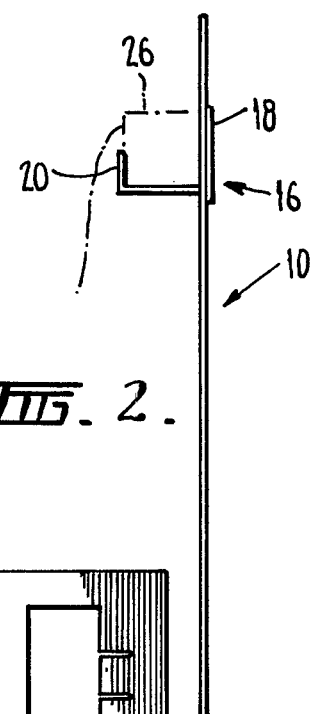
FIG. 2 is a side elevation of the support of FIG. 1.

Generally, U-shaped brackets 16 are provided, which have one arm 18 of the 'U' longer than the other arm 20 (see FIG. 2). The brackets are preferably also made from polypropylene. The brackets are adapted to be positioned within the slots 24, such that the base of the bracket is within a slot, and the arm 18 is behind the frame when two brackets are positioned in an opposed pair of slots, as shown in FIG. 1, they are ready to receive and support a cuboidal box (shown in broken lines as 26), such as the type of box used to store and dispense GLAD (Registered Trade Mark) plastic sheet and AL-FOIL (Registered Trade Mark) aluminium foil, in roll form.

It can be seen that with the described support, a box containing sheet material in roll form can be supported such that the contents may be easily dispensed. Clearly, a number of boxes of different material could be supported by a number of pairs of brackets supported in pairs of opposed slots in one frame. The support means is intended to be vertically positioned, and preferably attached to a wall, or to the inside or outside of a cupboard door.

It should also be evident that in a further embodiment (not shown in the drawings) the brackets may be adapted to hold the rolls of sheet material and the like, rather than the boxes 26. The references in this specification to dispensers should be taken to include both cuboidal boxes and the rolls of sheet material themselves.

We claim:

1. A support for retaining dispensers (26), said support comprising a substantially planar frame member (10) wherein:

said frame member (10) is provided with a plurality of substantially rectangular apertures (12) therein, at least a first of said apertures being arranged adjacent to a respective side portion (22) of said frame member (10) and at least a second of said apertures being opposed to said first aperture and arranged adjacent the other side portion (22) of said frame member (10), said first and second apertures (12) being separated by a portion (14) of said frame member (10), a plurality of substantially horizontal slots (24) extending into each side portion (22) and communicating with the respective adjacent rectangular aperture (12), said slots (24) in one of said side portions (22) being opposed to other slots in the other of the side portions (22), such that first bracket means (16) being engagable with a slot (24) in one of the side portions (22) by being insertable into the adjacent and sliding the bracket means (16) into engagement with the slot, and a second bracket means (16) engagable with an opposed slot (24) in the other of the side portions (22) and being insertable into the adjacent aperture and sliding the second bracket means (16) into engagement with the slot (24), whereby said dispenser may be supported on the first and second bracket means (16).

2. A support according to claim 1 wherein: four rectangular apertures are provided, the four rectangular apertures being defined by the side portions (22), top and bottom members of the frame and a cross member (14) of the frame integral with the top and bottom portions and the side portions (22), said four apertures thereby being arranged in two opposed pairs, the apertures in each pair being adjacent a respective opposed side portion (22).

3. A support according to either claim 1 or claim 2 wherein: the bracket means (16) comprises a bracket having two arms (18) and (20) and a base section substantially in the form of a "U", one arm (18) of the bracket being larger than the other (20) and wherein the base section of the bracket is received in one of said slots (24) and the longer arm (18) of the "U" is engagable behind the frame (10) such that a dispenser (26) may be held between the other arm (20) of the bracket and the frame (10).

* * * * *